(12) United States Patent
Xu et al.

(10) Patent No.: US 9,804,626 B2
(45) Date of Patent: Oct. 31, 2017

(54) APPLICATION TOPOLOGY RECOGNITION METHOD FOR DISTRIBUTION NETWORKS

(71) Applicants: SHANDONG UNIVERSITY OF TECHNOLOGY, Shandong (CN); SHANDONG KEHUI POWER AUTOMATION CO., LTD, Shandong (CN)

(72) Inventors: Bingyin Xu, Zibo (CN); Jinghua Wang, Zibo (CN)

(73) Assignees: SHANDONG UNIVERSITY OF TECHNOLOGY, Zibo, Shandong (CN); SHANDONG KEHUI POWER AUTOMATION CO., LTD, Zibo, Shandong (CN)

( * ) Notice: Subject to any disclaimer, the term of this patent is extended or adjusted under 35 U.S.C. 154(b) by 176 days.

(21) Appl. No.: 14/897,710

(22) PCT Filed: Apr. 19, 2014

(86) PCT No.: PCT/CN2014/075754
§ 371 (c)(1),
(2) Date: Dec. 11, 2015

(87) PCT Pub. No.: WO2014/198158
PCT Pub. Date: Dec. 18, 2014

(65) Prior Publication Data
US 2016/0124452 A1  May 5, 2016

(30) Foreign Application Priority Data
Jun. 14, 2013 (CN) .......................... 2013 1 0235211

(51) Int. Cl.
*G05F 1/66* (2006.01)
*H02J 13/00* (2006.01)
(Continued)

(52) U.S. Cl.
CPC ............... *G05F 1/66* (2013.01); *G05B 15/02* (2013.01); *G06F 17/3051* (2013.01);
(Continued)

(58) Field of Classification Search
CPC ..... G05F 1/66; H04L 41/12; G06F 17/30864; G06F 17/30371; G06F 17/3051; G05B 15/02; H02J 13/00
See application file for complete search history.

(56) References Cited

U.S. PATENT DOCUMENTS 5,964,837 A * 10/1999 Chao ....................... H04L 41/22
709/224
2001/0033550 A1* 10/2001 Banwell .............. H04L 41/0213
370/254

(Continued)

FOREIGN PATENT DOCUMENTS

| AU | 2003227169 B2 | 10/2003 |
| CN | 02116363.4 | 3/2002 |
| CN | 102820707 A * | 12/2012 |

*Primary Examiner* — Kenneth M Lo
*Assistant Examiner* — David Wynne
(74) *Attorney, Agent, or Firm* — Reinhart Boerner Van Deuren P.C.

(57) ABSTRACT

The present invention relates to a method for automatic identification of an application network topology for power distribution network control which belongs to the field of electric power automation. The method comprises the following steps: 1. statically configuring attributes of a switch; 2. determining, by a power distribution network intelligent terminal STU, whether a query trigger condition is satisfied; 3. sending, by an inquirer, a query command to initiate the query into an application network topology; 4. replying to the query command; 5. receiving the query command; 6. checking the integrity of the switch attribute information; and 7. forming an application network topology. The present method for automatic identification of an application net- (Continued)

work topology for a power distribution network control has few calculations and can be executed with high speed, ensures the integrity and reliability of information, and is particularly suitable for distributed intelligent control of the power distribution network. The establishment of the application network topology is distributed to each power distribution network intelligent terminal STU, thus reducing heavy calculation, and is suitable for applications having relatively few embedded system software and hardware resources.

7 Claims, 2 Drawing Sheets

(51) Int. Cl.
  *G05B 15/02* (2006.01)
  *G06F 17/30* (2006.01)
  *H04L 12/24* (2006.01)

(52) U.S. Cl.
  CPC .. *G06F 17/30371* (2013.01); *G06F 17/30864* (2013.01); *H02J 13/00* (2013.01); *H04L 41/12* (2013.01)

(56) References Cited

U.S. PATENT DOCUMENTS

| | | | |
|---|---|---|---|
| 2013/0188520 A1* | 7/2013 | Muntianu | H04L 67/2842 370/255 |
| 2013/0250810 A1* | 9/2013 | Ho | H04L 41/12 370/255 |

\* cited by examiner

APPLICATION TOPOLOGY RECOGNITION METHOD FOR DISTRIBUTION NETWORKS

FIELD OF THE INVENTION

The present invention relates to a method for automatic identification of an application network topology for power distribution network control which belongs to the field of electric power automation. The present invention specifically relates to an application oriented method for automatic identification of an application network topology for power distribution network control.

BACKGROUND

Topology analysis of a power distribution network refers to topology link analysis of an entire network according to power supply nodes, switch nodes and so on by considering the entire network as a topological diagram with a combination of lines and points according to the connection relationship of power distribution electrical elements. The power distribution network conducts other analysis such as state estimation, load flow calculation, fault location, isolation and power supply restoration, and network reconfiguration. Power distribution network has a huge and complex structure, and the network structure often changes due to on/off status of the switches in load transfer operation during a fault.

In this respect, there are presently methods at home and abroad, such as association list matrix representation, network-based matrix representation, node elimination method, tree searching representation and discrete processing method, all of which are developed based on a master station system, have high system requirements and low speed. Therefore, they can not be applied to power distribution terminals and can not meet real time requirements for protection and control by distributed intelligence.

Patent document CN 02116363.4 proposed a method for collecting network topology information for communication network. The method collects network topology information in Internet protocol and is capable of identifying positional relationships among devices in the network. In communication field, it is not accurate since devices are relatively dispersed and are not fixed in positions. However, since power distribution terminal devices in a power distribution network feature relatively fixed number and installation sites and the power distribution network has a particularly high reliability requirement, the method for collecting information on network topology of a communication network disclosed by this patent document is not suitable for a power distribution network.

Distributed intelligent control needs to adapt to real time change in network structure, such as requiring dynamic identification of positions of tie switches for fault recovery, tracking a main network power source for islanding protection, and load pre judgement for load transfer, all of which need to know network topology relationship in real time. Therefore, it is particularly important to invent an application oriented method for identifying a real-time network topology that enables each application to maintain one dynamic network topology for the application.

SUMMARY

The technical problems to be addressed by the present invention is to overcome deficiencies of the prior art, and the present invention provides a method for automatic identification of an application network topology for power distribution network control that has few calculations, can be executed at high speed and can ensure the integrity and reliability of information, and is particularly applicable to distributed intelligent control of a power distribution network.

The technical solution to address the technical problems of the present invention is a method for automatic identification of an application network topology for power distribution network control, which comprises the following steps:

step 1: statically configuring attributes of a switch, in which the switch attributes and the application network topology types are statically configured firstly for a power distribution network intelligent terminal STU which corresponds to a power distribution network switch in the power distribution network;

said switch attributes comprise an inherent attribute and a position attribute of the power distribution network switch, wherein the inherent attribute is classified into a substation outlet switch, section switch and end switch; and the position attribute of the switch is a position of the switch in the network, together with network addresses of power distribution network switches adjacent to said switch.

step 2: determining, by the power distribution network intelligent terminal STU, whether a query trigger condition is satisfied, in which the power distribution network intelligent terminal STU determines whether the query trigger condition preset by itself for a real-time application network topology is satisfied; if the query trigger condition is satisfied, then step 3 is carried out, and if the query trigger condition isn't satisfied, then a query is not initiated;

step 3: sending, by an inquirer, a query command to initiate a query into the application network topology, in which any power distribution network intelligent terminal STU in the power distribution network corresponding to a power distribution network switch can be used as the inquirer that sends a query command for querying application network topology to an adjacent power distribution network intelligent terminal STU, wherein the query command is passed level by level down until a terminal switch is encountered;

step 4: replying to the query command, in which after receiving the query command for querying application network topology, a power distribution network intelligent terminal STU corresponding to the terminal switch sends its respective switch attribute information back to an upper level of power distribution network intelligent terminal STU that has sent the query command for querying application network topology, and the present level of power distribution network intelligent terminal STU, after receiving the switch attribute information sent from a lower level of power distribution network intelligent terminal STU, sends its respective switch attribute information along with the received switch attribute information from the lower level back to the upper level of power distribution network intelligent terminal STU, and refills data length check code, until the switch attribute information is sent level by level to the inquirer sending the command for querying application network topology;

step 5: receiving the switch attribute information of power distribution network switches, in which step 6 is carried out after the inquirer receives the switch attribute information of all power distribution network switches in the power distribution network;

step 6: checking an integrity of the switch attribute information, in which the inquirer checks the integrity of all switch attribute information which should have an end as a terminal switch, wherein if all switch attribute information is complete, step 7 is carried out; if not, which means the query fails, then step 2 is carried out again;

step 7: forming an application network topology, in which the inquirer extracts its required topology information from the received switch attribute information of all power distribution network switches according to its application network topology so as to form an application topology network;

said application network topology comprises a position application topology, a load pre-judgement application topology, an application topology for automatic identification of tie switches, and an application topology for tracking a main network power source for islanding protection.

Said statically configuring the application network topology types at step 1 is: configuring the position application topology and the load pre-judgement application topology in the power distribution network intelligent terminal STU corresponding to said substation outlet switch; configuring the position application topology, the load pre-judgement application topology, and the application topology for automatic identification of tie switches in the power distribution network intelligent terminal STU corresponding to said section switch; configuring the position application topology in the power distribution network intelligent terminal STU corresponding to said end switch; and also configuring the application topology for tracking a main network power source for islanding protection in the power distribution network intelligent terminal STU corresponding to the end switch connected with a distributed power source.

Said query trigger condition for the power distribution network intelligent terminal STU at step 2 is a preset query period or a switch state change signal of a power distribution network switch corresponding to the power distribution network intelligent terminal STU.

Said terminal switch at steps 3 and 4 is the substation outlet switch or end switch.

Said switch attribute information comprises a switch number, inherent attribute, position attribute, on-off state, voltage information, load information and standby information of the corresponding power distribution network switch.

Said required topology information extracted by the inquirer from the received switch attribute information at step 7 is:

position attribute information required to be extracted from switch attribute information of the power distribution network switch for forming the position application topology;

position attribute and load information required to be extracted from switch attribute information of the power distribution network switch for forming the load pre-judgement application topology;

position attribute, on-off state and voltage information required to be extracted from switch attribute information of the power distribution network switch for forming the application topology for automatic identification of tie switches; and position attribute and on-off information required to be extracted from switch attribute information of the power distribution network switch for forming the application topology for tracking a main network power source for islanding protection.

Query commands for querying application network topology sent by any inquirer at step 3 are identical.

As compared to prior art, the present invention can achieve the following advantageous effects:

1. It can inquire network topology in real time, have few calculations and high query speed, and satisfy speed requirement of distributed intelligent control. It can overcome disadvantages of the prior art power distribution network topology technology, including generating an application network topology from top to bottom by a master station, requiring a longer time for one update, incapable of dynamic adjustment according to real time status of network, and incapable of satisfying speed requirement of distributed intelligent control.

2. In view of characteristics that an electric system power distribution network has a relatively small number of power distribution network intelligent terminals STUs on each feed line and the power distribution network intelligent terminals STUs have relatively constant positions and attributes, the present invention statically configures switch attributes to ensure integrity and reliability of information.

3. Application network topology of the present invention refers to real-time network topology information required by a specific control application. Each power distribution network intelligent terminal STU only needs to establish its own application network topology relation, extract information required by its own applications, distribute the establishment of application network topology to power distribution network intelligent terminals STUs, thereby being able to reduce the number of calculations, and being suitable for applications having relatively few embedded system software and hardware resources.

4. As compared to directly returning its own topology information by the inquired party to the original inquirer, the automatic identification method of the present invention has the advantages that information is passed at the shortest distance over the network, which can reduce network stress and collision probability, and also that when a power distribution network intelligent terminal STU receives a plurality of query commands, it combines them into one command and passes it down, and refills the data length check code, which can reduce processing workload of the original inquirer.

DETAILED DESCRIPTION

Figure 1:
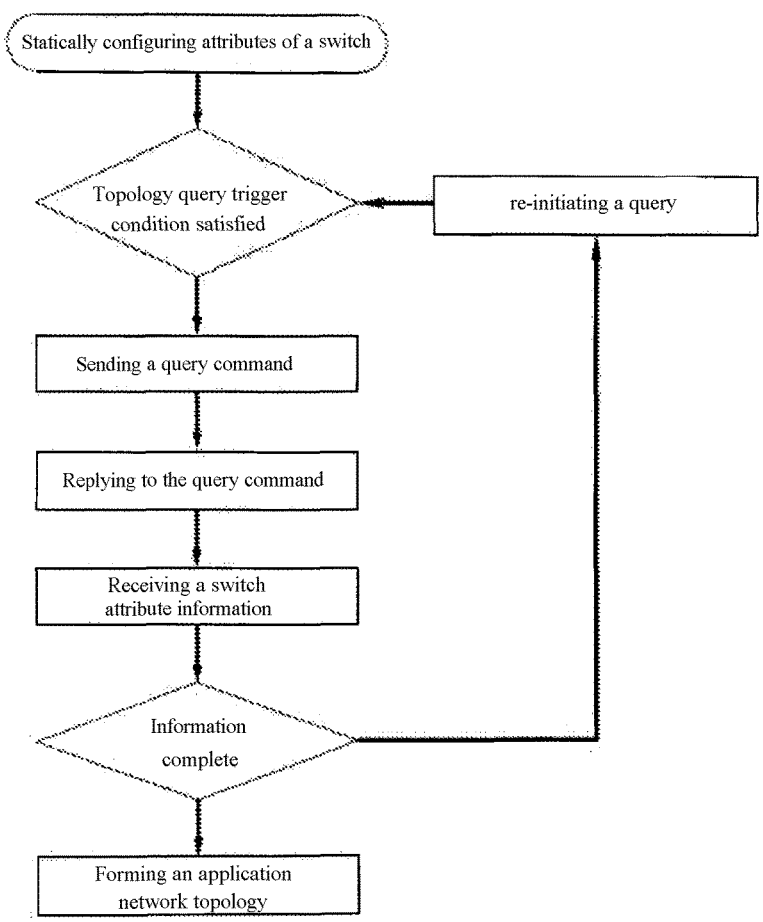
FIG. 1 is an illustrative flow chart of a method for automatic identification of an application network topology for power distribution network control.
Figure 2:
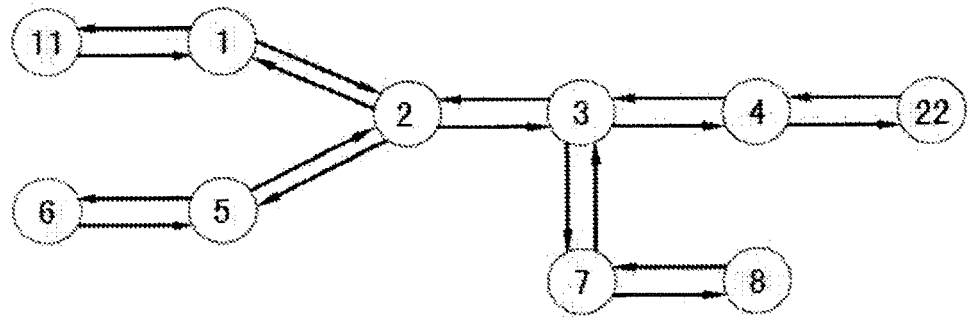
FIG. 2 is a topology information transfer diagram of a method for automatic identification of an application network topology for power distribution network control.
Figure 3:
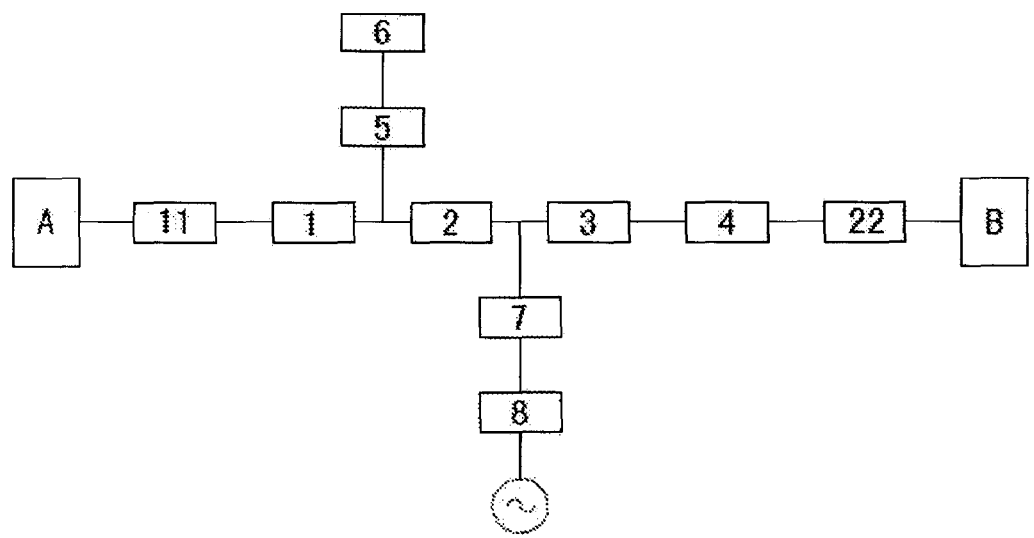
FIG. 3 is an illustrative topology diagram of a method for automatic identification of an application network topology for power distribution network control.

FIGS. 1-3 are preferred embodiments of the present invention. The present invention will be further described below in connection with FIGS. 1-3.

In a power distribution network, power distribution network switches mainly have the following forms: an end switch, a section switch, and a substation outlet switch. Each power distribution network switch is provided with a one-to-one corresponding power distribution network intelligent terminal STU, and according to the specific form of each power distribution network switch, its corresponding power distribution network intelligent terminal STU is configured with a required application network topology. In a power distribution network, any power distribution network intelligent terminal STU is on equal footing in functional distribution, and what application network topology is configured for it is completely dependent on its location, and may be changed.

As shown in FIG. 1, the process steps of a method for automatic identification of an application network topology for power distribution network control according to the present invention are as follows.

At step 1, attributes of a switch are statically configured.

The switch attributes including an inherent attribute and position attribute are statically configured for a power distribution network intelligent terminal STU corresponding to each power distribution network switch.

The inherent attribute of power distribution network switch includes a substation outlet switch, section switch, and end switch. Position attribute of a switch is a position of the switch in the network and network addresses of power distribution network switches adjacent to the switch. When statically configuring the position attribute, it is only needed to configure network addresses of the switches adjacent to it.

As shown in FIGS. 3, A and B are substations, power distribution network switches 11 and 22 are substation outlet switches, power distribution network switches 1, 2, 3, 4, 5, and 7 are section switches, and power distribution network switches 6 and 8 are end switches, wherein the end switch 8 is connected with a distributed power source. When statically configuring switch attributes for each power distribution network intelligent terminal STU, it is required to statically configure the types of application network topology in regard to the specific form of power distribution network switch corresponding to it at the same time.

Application network topology refers to real-time network topology information required by a specific control application. Any power distribution network intelligent terminal STU can establish its application topology, and whether or not to establish application network topology is determined by its attributes. There are mainly the following types of application network topologies: a position application topology, a load pre-judgement application topology, an application topology for automatic identification of tie switches, and an application topology for tracking a main network power source for islanding protection.

The power distribution network intelligent terminals STUs corresponding to the substation outlet switches 11 and 22 need to be configured with the position application topology and load pre-judgement application topology. Power distribution network intelligent terminals STUs corresponding to section switches 1, 2, 3, 4, 5 and 7 need to be configured with the position application topology, load pre-judgement application topology and application topology for automatic identification of tie switches. Power distribution network intelligent terminals STUs corresponding to end switches 6 and 8 need to be configured with the position application topology. The end switch 8 is connected with a distributed power source. Therefore, power distribution network intelligent terminal STU corresponding to the terminal switch 8 needs to be also configured with the application topology for tracking a main network power source for islanding protection at the same time.

At step 2, power distribution network intelligent terminal STU determines whether a query trigger condition is satisfied.

Application network topology configured for each power distribution network intelligent terminal STU needs to be updated in real time. The power distribution network intelligent terminal STU determines whether a preset query trigger condition is satisfied, which is a preset query period; or a switch state change signal of a power distribution network switch corresponding to the power distribution network intelligent terminal STU. If the query trigger condition is satisfied, then step 3 is carried out, and if the query trigger condition isn't satisfied, then a query is not initiated.

At step 3, an inquirer sends a query command to initiate a query into application network topology.

A query into application network topology is initiated by the inquirer that may be any power distribution network intelligent terminal STU in the power distribution network corresponding to the power distribution network switch. After the power distribution network intelligent terminal STU satisfies the query trigger condition, it sends a query command for querying application network topology to a preconfigured adjacent power distribution network intelligent terminal STU that continues to pass the query command for querying application network topology to its adjacent lower level of power distribution network intelligent terminal STU, and so on, until a substation outlet switch or an end switch is encountered.

As described above, there is a plurality of application network topologies in a power distribution network. In order to relieve channel stress and processing workloads of power distribution network intelligent terminal STU, the inquirer sends the same query command for querying application network topology.

As shown in FIG. 2, assuming that the section switch 3 is in open state, the power distribution network intelligent terminal STU corresponding to the section switch 3 would send a query command for querying application network topology, which is passed to section switch 2 in the left direction and to section switch 4 in the right direction, and to section switch 7 in the downward direction at the same time. Section switch 2 sends it to two adjacent switches, i.e., section switch 1 and section switch 5. Section switch 1 sends it to substation outlet switch 11, and section switch 5 sends it to end switch 6; thereby the query in the left direction ends here. Section switch 4 sends it to an adjacent substation outlet switch 22; thereby the query in the right direction ends here. Section switch 7 sends it to an adjacent end switch 8; thereby the downward query ends here.

At step 4, the query command is replied.

After receiving the query command for querying application network topology, the substation outlet switch or end switch sends its switch attributes to the adjacent power distribution network intelligent terminal STU that has sent the query command for querying application network topology to it. Any power distribution network intelligent terminal STU, which has received the switch attribute information returned from its adjacent power distribution network intelligent terminal STU, would send its switch attribute information along with the received switch attribute information returned by the adjacent power distribution network intelligent terminal STU back to the upper level of adjacent power distribution network intelligent terminal STU that has sent the query command for querying application network topology, and refill the data length check code, and so on, until the information is sent to the original inquirer.

As shown in FIG. 2, assuming that the inquirer is the power distribution network intelligent terminal STU corresponding to the section switch 3, and using substation outlet switch 11 as an example, after receiving the query command for querying application network topology sent by the section switch 1, the substation outlet switch 11 returns its switch attribute in the following format:

TABLE 1

| Data length | Attribute of switch 11 | Null | Null | Null |
|---|---|---|---|---| wherein the attribute of switch 11 contains the following information:

TABLE 2

| Switch number | Inherent attribute | Position attribute | State of switch | Voltage information | Load information | Standby | Standby |
|---|---|---|---|---|---|---|---|

Substation outlet switch 11 passes its switch information to the section switch 1 being an inquirer. After receiving the information returned by the substation outlet switch 11, the section switch 1 adds its switch attribute information to the received information and continues to pass it to the section switch 2 being an inquirer. The returned information to the section switch 2 is as follows:

TABLE 3

| Data length | Attribute of switch 11 | Information of switch 1 | Null | Null |
|---|---|---|---|---|

The section switch 2 receives the information returned by the section switch 1 and section switch 5, combines and adds the information to the present switch thereto, and then continues to pass it to the inquirer. The returned information to the section switch 3 is as follows:

TABLE 4

| Data length | Attribute of switch 11 | Information of switch 1 | Information of switch 6 | Information of switch 5 | Information of switch 2 |
|---|---|---|---|---|---|

At step 5, switch attribute information of the power distribution network switches is received.

The inquirer receives switch attribute information of all power distribution network switches in the power distribution network. In the present embodiment, as shown in FIG. 2, the power distribution network intelligent terminal STU corresponding to the section switch 3 being an inquirer receives switch attribute information, which includes switch attribute information from the section switch 2, including switch attribute information of the substation outlet switch 11, end switch 6, section switch 1, section switch 5 and section switch 2; switch attribute information from the section switch 4 including switch attribute information of the section switch 4 and substation outlet switch 22; and switch attribute information from the section switch 7 including switch attribute information of the section switch 7 and end switch 8.

At step 6, the integrity of switch attribute information is checked.

The inquirer checks the integrity of the received switch attribute information. After receiving switch attribute information of all power distribution network switches in the power distribution network, the inquirer checks the integrity of the switch attribute information. The end of information should be a substation outlet switch or a terminal switch. If all switch attribute information is complete, then step 7 is carried out. If not, which means failure of the query, then step 2 is carried out again for a next query.

At step 7, an application network topology is formed.

There are many application network topologies in a power distribution network. In order to relieve channel stress and processing workloads of power distribution network intelligent terminal STU, the inquirer sends the same query command for querying application network topology. For all of the received switch attribute information, the inquirer extracts its required information from switch attribute information of all power distribution network switches according to the type of application network topology configured for itself, so as to form the application network topology.

The topology establishment modes of application network topologies that are required by power distribution network switches at step 1 and switch attribute information of the power distribution network switches that is required to be extracted are as follows.

(1) Position Application Topology

As described above, all power distribution network switches in the power distribution network need to be configured with the position application topology. As an inquirer for the position application topology, the power distribution network intelligent terminal STU corresponding to a power distribution network switch, after receiving switch attribute information of all power distribution network switches in the power distribution network, firstly checks the integrity of information, with the end of the information being a substation outlet switch or a terminal switch; and extracts information related to its application for establishing the application topology.

With respect to the position application topology, only position attributes in the returned information need to be extracted for identifying positions of power distribution network switches in the entire network.

(2) Application Topology for Automatic Identification of Tie Switches

As described above, section switches in a power distribution network all need to be configured with the application topology for automatic identification of tie switches. Using section switch 3 as an example, as an inquirer for the application topology for automatic identification of tie switches, the section switch 3, after collecting network topology information, firstly checks the integrity of the information, with the end of the information being a substation outlet switch or terminal switch; and extracts information related to its application for establishing the application topology.

With respect to the application topology for automatic identification of tie switches, only position attributes, switch information and voltage information in the returned information need to be extracted for determining whether it is or not a tie switch.

(3) Application Topology for Tracking a Main Network Power Source for Islanding Protection As described above, an end switch in the power distribution network connected with a distributed power source needs to be configured with the application topology for tracking a main network power source for islanding protection. In the present embodiment, as an inquirer for the application topology for tracking a main network power source for islanding protection, the end switch 8, after collecting network topology information, firstly checks the integrity of the information, with the end of information being a substation outlet switch or terminal switch; and extracts information related to its application for establishing the application topology.

With respect to the application topology for tracking a main network power source for islanding protection, only position attributes and switch information in the returned information need to be extracted for determining a main network power source connected with the distributed power source. The end switch 8 detects the connection relationship between the distributed power source and main network power source in real time by utilizing the network topology information, and performs an islanding protection after detecting detachment from the main network power source.

(4) Load Pre Judgement Application Topology

As described above, section switches and substation outlet switches in the power distribution network all need to be configured with a load pre-judgement application topology. Using section switch 3 as an example, after confirming itself as a tie switch, the section switch 3 needs to prejudge load before the tie switch is to be switched on. As an inquirer for the load pre-judgement application topology during a load transfer process, the tie switch 3, after collecting network topology information, firstly checks the integrity of the information, with the end of the information being a substation outlet switch or terminal switch; and extracts information related to its application for establishing the application topology.

With respect to the load pre-judgement application topology, only position attributes and load information in the returned information need to be extracted for determining whether the tie switch can be switched on. If the spare capacity is sufficient, then the tie switch may be switched on, and if the spare capacity is insufficient, then the tie switch can not be switched on.

What have been described above are only preferred embodiments of the present invention, but are not intended to limit the present invention in any other forms. Those skilled in the art can change or modify the above disclosed technical aspects into equivalent embodiments, without departing from the scope of technical aspects of the present invention. Any simple modifications, equivalent variations and changes made to the above embodiments according to the technical essence of the present invention shall still be within the scope of the technical aspects of the present invention.

The invention claimed is:

1. A method for automatic identification of an application network topology for power distribution network control, which comprises the following steps:
   step 1: statically configuring attributes of a switch, in which
   the switch attributes and the application network topology types are statically configured firstly for a power distribution network intelligent terminal STU which corresponds to a power distribution network switch in the power distribution network;
   said switch attributes comprise an inherent attribute and a position attribute of the power distribution network switch, wherein the inherent attribute is classified into a substation outlet switch, a section switch and an end switch; the position attribute of the switch is a position of the switch in the network, together with network addresses of power distribution network switches adjacent to said switch;
   step 2: determining, by the power distribution network intelligent terminal STU, whether a query trigger condition is satisfied, in which
   the power distribution network intelligent terminal STU determines whether the query trigger condition preset by itself for a real-time application network topology is satisfied, and if the query trigger condition is satisfied, then step 3 is carried out, and if the query trigger condition isn't satisfied, then a query is not initiated;
   step 3: sending, by an inquirer, a query command to initiate a query into the application network topology, in which
   any power distribution network intelligent terminal STU in the power distribution network corresponding to a power distribution network switch can be used as the inquirer that sends a query command for querying the application network topology to an adjacent power distribution network intelligent terminal STU, wherein the query command is passed level by level down until a terminal switch is encountered;
   step 4: replying to the query command, in which
   after receiving the query command for querying application network topology, a power distribution network intelligent terminal STU corresponding to the terminal switch sends its respective switch attribute information back to an upper level power distribution network intelligent terminal STU having sent the query command for querying application network topology, and
   the present level of power distribution network intelligent terminal STU, after receiving the switch attribute information sent from a lower level of power distribution network intelligent terminal STU, sends its switch attribute information along with the received switch attribute information from the lower level back to the upper level of power distribution network intelligent terminal STU, and refills data length check code, until the switch attribute information is sent level by level to the inquirer sending the command for querying application network topology;
   step 5: receiving the switch attribute information of power distribution network switches, in which
   step 6 is carried out after the inquirer receives the switch attribute information of all power distribution network switches in the power distribution network;
   step 6: checking an integrity of the switch attribute information, in which
   the inquirer checks the integrity of all switch attribute information which should have an end as a terminal switch, wherein if all switch attribute information is complete, then step 7 is carried out; if not, which means the query fails, then step 2 is carried out again;
   step 7: forming an application network topology, in which
   the inquirer extracts its required topology information from the received switch attribute information of all power distribution network switches according to its application network topology so as to form an application topology network;
   said application network topology comprises a position application topology, a load pre judgement application topology, an application topology for automatic identification of tie switches, and an application topology for tracking a main network power source for islanding protection;

wherein power distribution network control is performed based on said application network topology.

2. The method for automatic identification of an application network topology for power distribution network control according to claim 1, characterized in that:

Said statically configuring the application network topology types at step 1 is: configuring the position application topology and the load pre-judgement application topology in the power distribution network intelligent terminal STU corresponding to said substation outlet switch; configuring the position application topology, the load pre-judgement application topology, and the application topology for automatic identification of tie switches in the power distribution network intelligent terminal STU corresponding to said section switch; configuring the position application topology in the power distribution network intelligent terminal STU corresponding to said end switch; and also configuring the application topology for tracking the main network power source for islanding protection in the power distribution network intelligent terminal STU corresponding to the end switch connected with a distributed power source.

3. The method for automatic identification of an application network topology for power distribution network control according to claim 1, characterized in that:

Said query trigger condition for the power distribution network intelligent terminal STU at step 2 is a preset query period or a switch state change signal of a power distribution network switch corresponding to the power distribution network intelligent terminal STU.

4. The method for automatic identification of an application network topology for power distribution network control according to claim 1, characterized in that:

Said terminal switch at steps 3 and 4 is the substation outlet switch or end switch.

5. The method for automatic identification of an application network topology for power distribution network control according to claim 1, characterized in that:

Said switch attribute information comprises a switch number, inherent attribute, position attribute, on-off state, voltage information, load information and standby information of the corresponding power distribution network switch.

6. The method for automatic identification of an application network topology for power distribution network control according to claim 1, characterized in that:

the required topology information extracted by the inquirer from the received switch attribute information at step 7 is:

position attribute information required to be extracted from switch attribute information of the power distribution network switch for forming the position application topology;

position attribute and load information required to be extracted from switch attribute information of the power distribution network switch for forming the load pre-judgement application topology;

position attribute, on-off state and voltage information required to be extracted from switch attribute information of the power distribution network switch for forming the application topology for automatic identification of tie switches; and position attribute and on-off information required to be extracted from switch attribute information of the power distribution network switch for forming the application topology for tracking a main network power source for islanding protection.

7. The method for automatic identification of an application network topology for power distribution network control according to claim 1, characterized in that:

query commands for querying application network topology sent by any inquirer at step 3 are identical.

* * * * *